Dec. 10, 1929.  H. K. SWENEY  1,739,472
CONDUIT COUPLING
Filed Dec. 31, 1927

Inventor
Harry K. Sweney.
By William C. Linton
Attorney

Patented Dec. 10, 1929

1,739,472

UNITED STATES PATENT OFFICE

HARRY K. SWENEY, OF EVANSVILLE, WYOMING

CONDUIT COUPLING

Application filed December 31, 1927. Serial No. 243,961.

This invention relates to improvements in conduit couplings, more especially, to that type of coupling set forth in my United States Letters Patent numbered 1,475,150 and 1,652,064, constituting an improvement thereover in that it provides a coupling advantageous for use in connection with the sections of cement or other plastic conduits, allowing for expansion or contraction of the sections without detrimentally affecting the efficiency of the coupling or joint, as well as a certain degree of relative movement between the sections due to the settling of the same in a trench or other bed, and additionally, permits of a quicker and more simple assembly and connection of the parts, allowing the joint, if needs be, to be effected by unskilled labor.

It is also an object of the invention to provide a conduit coupling utilizing interfitting members, the cofunctioning ends of which are constructed in a manner to permit of pivotal movement between the same without affecting the liquid tight character thereof, while means are engaged with said ends in a manner to insure the positive connection therebetween against relative longitudinal movement and at the same time, draw such ends into positive interengagement.

Other objects of the invention will be in part obvious and in part pointed out hereinafter.

In order that the invention and its mode of operation may be readily understood by those skilled in the art to which it appertains, I have in the accompanying illustrative drawings and in the detailed following description based thereupon, set out one possible embodiment of the invention.

Figure 1:
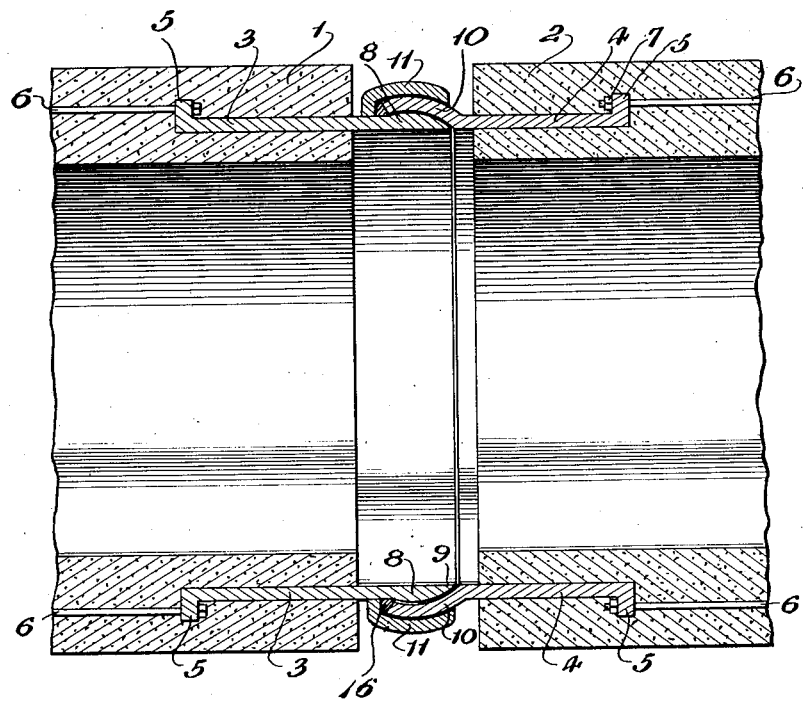
Figure 2:
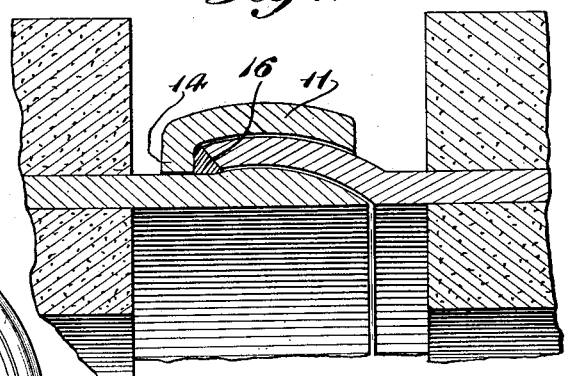
Figure 3:
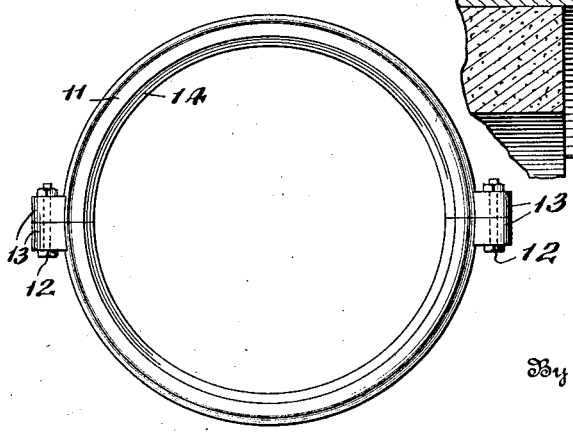

In these drawings:

Figure 1 is a fragmentary longitudinal section through a sectional cement conduit wherein the adjacent ends of said conduit are coupled or interconnected through the medium of the improved joint, Figure 2 is a fragmentary detail in longitudinal section showing the interengaged parts of the joint and the clamping ring therefor slightly enlarged, and Figure 3 is an end elevation of the improved split clamping ring employed in connection with the invention.

Having more particular reference to the drawings, in connection with which like characters of reference will designate corresponding parts throughout, the improved coupling is particularly adapted for usage in connection with cement or other plastic conduits or culverts indicated for convenience at this time by the numerals 1 and 2, the adjacent ends of said conduits 1 and 2 or rather the sections, having sleeve like members or collars 3 and 4 embedded therein, the embedded extremities of said collars being formed with annular flanges 5 through which anchor or tie rods 6 are passed that the respective collars 3 or 4 engaged thereby will be positively retained in fixed relation or position with respect to their particular conduit sections; nuts or other suitable locking or connecting devices 7 being turned into engagement with the screw threaded extremities of said rods 6 which are passed through openings in the several annular flanges 5.

A portion of each of the collars 3 and 4 extends from the end of the conduit section 1 or 2 receiving the same and upon the extended portion of the collar or sleeve like member 3 there is formed an enlarged bearing portion 8, the outer face or surface of which is curved or semi-spherical; the outer extremity or marginal portion of said end of the collar 3 being feathered or tapered as is indicated by the numeral 9 because of the formation of said semi-spherical surface upon the enlarged portion 8.

The collar or sleeve like member 4 has its particular extend portion formed with an enlarged annular skirt or substantially bell like extension designated by the numeral 10, said portion being curved transversely as indicated in the Figures 2 and 3, and having the degree of curvature of its inner peripheral surface corresponding to that of the curved bearing surface upon the outer peripheral portion of the enlarged part 8, hence, paralleling the same with reception of the enlarged portion 8 therein in the manner as is shown in the Figures 1 and 2, thus providing upon the interengaged extended ends of the collars 3 and 4, complemental semispherical bearing surfaces.

With a view toward providing the collars 3 and 4 with means for interconnecting the same in a manner to prevent relative longitudinal movement therebetween and at the same time, allow of pivotal movement between the inner engaged semispherical bearing surfaces of the parts 8 and 10, I provide the construction with a diametrically divided or sectional clamping ring or sleeve 11, curving said sleeve transversely upon itself to correspond to the curvature of the outer peripheral surface of the transversely curved annular skirt 10, whereby with engagement of the sections of the clamping ring or sleeve thereover, the inner peripheral portion of said sleeve 11, which is in substantially the same degree of curvature as the outer peripheral portion thereof, will be arranged in parallelism to the annular skirt 10. Consequently, with the passing of connecting bolts or other suitable fastening devices 12 through the complementally arranged apertured ears 13 carried upon the opposite extremities of the diametrically divided sections of the clamping ring or sleeve 11, said sections of the sleeve will be drawn inwardly with respect to the outer peripheral surface of the annular skirt 10 but will be so arranged with respect to the same as to provide it with a fixed path for its pivotal movement over the semispherical bearing surface of the enlarged portion 8 of the collar 3. Also, an inwardly disposed lip or shoulder 14 is formed upon one side of the clamping ring or sleeve 11, that is, upon each of the sections thereof and because of this, it will be understood that with interconnection of the apertured ears 13 by means of the bolts or connecting devices 12, said shoulder will be moved into fixed or positive engagement with the adjacent peripheral portion of the collar 3, thereby rigidly securing the clamping sleeve with respect to this collar and allowing for the pivotal or movable reception of the transversely curved annular skirt 10 between it and the semispherical bearing surface of the enlarged portion 8.

At this point, it is to be noted that the arc of the transverse curvature of the sectional clamping ring or sleeve 11 is such that it will extend over the semispherical or curved annular skirt 10 to an extent as is shown in the Figures 1 and 2, hence, causing the said skirt portion 10 and the collar 4 carrying it to be positively maintained in interengagement over the semi-spherical bearing portion of the part 8 and thereby, prevent relative longitudinal displacement or movement as between the interengaged extremities or ends of the collars 3 and 4. Thus, it will be seen that the clamping ring or sleeve 11 serves a dual capacity, first as a means for engaging the transversely curved annular skirt 10 of the collar 4 over the semi-spherical bearing surface of the enlarged portion 8 of the collar 3 and second, as a means for retaining said annular skirt portion 10 in its engaged position over the enlarged portion 8 and against longitudinal displacement or movement with respect thereto due to the fixed engagement of the annular shoulder or flange portion 14 with the collar 3 and the overlapping engagement of the clamping ring or sleeve proper with respect to the said annular skirt portion 10.

That a liquid tight connection will be effected between the interengaged portions of the collars 3 and 4, I reduce or inwardly bevel the outer extremity of the annular skirt 10, as is indicated by the numeral 15, engaging a filled lead gasket 16 over an adjacent portion of the collar 3 and under the beveled or tapered portion 15 of the skirt 10 while the opposite or outer portion of the gasket has abutting engagement with the shoulder 14. Thus, with clamping of the ring or sleeve 11 about the inter-engaged parts 8 and 10, the filled lead gasket 16 will be subjected to pressure resulting therefrom and in so doing, will by reason of its flexible character, be distorted to such an extent as to ride snugly adjacent the contacting portions of the collar 4, the shoulders 14, the clamping sleeve sections 11 and the beveled portion 15 of the skirt 10, thus effecting a liquid tight jointure as between such elements.

From the foregoing, it will be understood that I have provided a joint especially advantageous for use in plastic conduits or culverts, the construction of which is such as will permit of its setting up or "making" by unskilled labor without in any way affecting the efficiency of the same. The collars 3 and 4 together with their parts 8 and 10 and the clamping ring or sleeve 11 may be formed of any suitable material, such as conditions or preference may dictate, such as cast metal, steel, or the like.

Under certain conditions, it may be desirable to provide a protective sheathing or coating of plastic material over the joint effected through the medium of the invention and in such instances, it is to be understood that such material will have a sufficient plasticity as will allow for the relative movement between the interengaged portions 8 and 10 of the collars 3 and 4.

Manifestly, the construction shown is capable of considerable modification and such modification as is within the scope of my claims, I consider within the spirit of my invention.

I claim:

1. A conduit coupling comprising a pair of cooperating collars, each carried by the adjacent ends of the conduit sections to be coupled, the end of one of said collars having its outer peripheral portion formed with a semi-spherical bearing surface, the end of the remaining collar being provided with an enlarged skirt having semi-spherical inner and outer surfaces, the inner semi-spherical surface of said skirt being engaged over said semi-spherical bearing surface of the first mentioned collar, and a rigid clamping sleeve concentric with the outer semi-spherical surface of the skirt and engaged over the same, one edge of said sleeve terminating short of the skirt and the other edge of said sleeve snugly engaging the outer peripheral portion of the first mentioned collar beyond the semi-spherical bearing surface thereof.

2. A conduit coupling comprising a pair of cooperating collars each carried by the adjacent ends of the conduit sections to be coupled, the end of one of said collars having its outer peripheral portion formed with a semi-spherical bearing surface, the end of the remaining collar being provided with an enlarged skirt having semi-spherical inner and outer surfaces, the inner semi-spherical surface of said skirt being engaged over said semi-spherical bearing surface of the first mentioned collar and extending over the same, and a rigid clamping sleeve concentric with the outer semi-spherical surface of the skirt and engaged over the same, one edge of said sleeve terminating short of the skirt and the other edge of said sleeve having inwardly disposed annular shoulders snugly engaging the outer peripherical portion of the first mentioned collar beyond the semi-spherical bearing surface of the latter.

3. A conduit coupling comprising a pair of cooperating collars each carried by the adjacent ends of the conduit sections to be coupled, the end of one of said collars having its outer peripheral portion formed with a semi-spherical bearing surface, the end of the remaining collar being provided with an enlarged skirt having semi-spherical inner and outer surfaces, the inner semi-spherical surface of said skirt being engaged over said semi-spherical bearing surface of the first mentioned collar and extending over the same, a rigid clamping sleeve concentric with the outer semi-spherical surface of the skirt and engaged over the same, one edge of said sleeve terminating short of the skirt and the other edge of said sleeve having inwardly disposed annular shoulders snugly engaging the outer peripheral portion of the first mentioned collar beyond the semi-spherical bearing surface of the latter and spaced from the outer extremity of said skirt, and a packing gasket between the outer extermity of the skirt and the inwardly disposed annular shoulders of the sleeve.

In witness whereof I have hereunto set my hand.

HARRY K. SWENEY.